(12) United States Patent
Komiya

(10) Patent No.: US 6,903,528 B2
(45) Date of Patent: Jun. 7, 2005

(54) MACHINE MODEL ESTIMATING DEVICE OF ELECTRIC MOTOR CONTROL APPARATUS

(75) Inventor: Takehiko Komiya, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/488,475
(22) PCT Filed: Sep. 4, 2002
(86) PCT No.: PCT/JP02/09006
§ 371 (c)(1),
(2), (4) Date: Mar. 3, 2004
(87) PCT Pub. No.: WO03/021762
PCT Pub. Date: Mar. 13, 2003

(65) Prior Publication Data
US 2004/0245959 A1 Dec. 9, 2004

(30) Foreign Application Priority Data
Sep. 4, 2001 (JP) .................... 2001-267566

(51) Int. Cl.[7] ............................. G05B 5/01
(52) U.S. Cl. ............. 318/611; 318/629; 318/632; 318/638; 381/94.1; 381/94.2
(58) Field of Search ................. 318/611, 615, 318/623, 629, 632, 638; 381/71.1, 94.1, 94.2

(56) References Cited

U.S. PATENT DOCUMENTS 4,963,806 A * 10/1990 Shinohara et al. .......... 318/621
5,155,422 A * 10/1992 Sidman et al. ............. 318/560
5,960,091 A * 9/1999 White et al. ............... 381/98
6,211,640 B1 * 4/2001 Fujisaki et al. ............ 318/636
6,219,196 B1 * 4/2001 Semba et al. .............. 360/75

FOREIGN PATENT DOCUMENTS

| JP | 10-323071 A | 12/1998 |
|----|-------------|---------|
| JP | 11-194073 A | 7/1999 |
| JP | 2000-197382 A | 7/2000 |
| JP | 2001-157478 A | 6/2001 |
| WO | WO 00/23934 A | 4/2000 |

* cited by examiner

Primary Examiner—Rina Duda
(74) Attorney, Agent, or Firm—Sughrue Mion, PLLC

(57) ABSTRACT

A machine model estimating device of an electric motor control apparatus having an electric motor for driving a load machine, a rotation detector for detecting a rotating angle of the electric motor, and a servo control device for controlling the electric motor. The machine has a calculating device for outputting an operation command signal for operating the electric motor to the servo control device, and frequency characteristic equations for a rigid body model and an N-inertia model, N being an integer which is equal to or greater than 2, which are previously input to the calculating device. The calculating device includes a frequency characteristic measuring section, a frequency characteristic peak detecting section, an attenuation estimation value analyzing section, a frequency characteristic error calculating section, and a machine model deciding section.

4 Claims, 11 Drawing Sheets

11
RIGID BODY LOAD

SPRING (K)
14a

J1

14b
ATTENUATION (D)

J2

12
ELECTRIC MOTOR
SIDE LOAD

13
LOAD SIDE LOAD

MACHINE MODEL ESTIMATING DEVICE OF ELECTRIC MOTOR CONTROL APPARATUS

TECHNICAL FIELD

The present invention relates to a machine model estimating device of an electric motor control apparatus which can faithfully estimate a machine model to be easily utilized for a simulation and a servo regulation by automatically reading an anti-resonance frequency, a resonance frequency and an attenuation from a frequency characteristic measured value without using an expensive measuring apparatus even if an operator has neither advanced expertise nor experiences, and is inexpensive.

BACKGROUND ART

Conventionally, an electric motor control apparatus to be used in a semiconductor manufacturing apparatus, a positioning apparatus such as a machine tool or an industrial robot is constituted as shown in FIG. 15.

FIG. 15 is a view showing the whole structure of the electric motor control apparatus according to the conventional art, and description will be given by taking a positioning apparatus as an example.

In the drawing, 2 denotes a servo control device, 3 denotes a rotation detector, 4 denotes an electric motor, 5 denotes a transmitting mechanism, 6 denotes a movable section, and 7 denotes a non-movable section. In this case, the transmitting mechanism 5 and the movable section 6 which constitute a load machine indicate a ball screw and a table respectively, and the non-movable section 7 indicates a base. Moreover, 8 denotes an operation command signal, 9 denotes a rotation detector signal, and 10 denotes a control signal. Furthermore, 17 denotes a signal generator and 18 denotes an FFT analyzer, and both of them grasp the frequency characteristic of the load machine and are used for devices required for the servo regulation of the control apparatus.

In such an electric motor control apparatus, first of all, the signal generator 17 outputs the operation command signal 8 and the operation command signal 8 is then sent to the servo control device 2. Next, the operation command signal 8 input to the servo control device 2 is sent as the control signal 10 to the electric motor 4, and operates the movable section 6 through the transmitting mechanism 5 by the rotating force of the electric motor 4. Thereafter, the rotation detector 3 sends the rotation detector signal 9 of the electric motor 4 to the FFT analyzer 18 through the servo control device 2. Subsequently, the FFT analyzer 18 carries out a fast Fourier calculation by using the operation command signal 8 received from the signal generator 17 and the rotation detector signal 9 received from the servo control device 2 and then calculates a frequency characteristic, and decides the characteristic of the load machine from the result of the calculation.

In the conventional art, however, the expensive FFT analyzer 18 is required for measuring the frequency characteristic of the load machine. Therefore, there is a problem in that the cost of equipment is increased. In order to decide the frequency characteristic measured by the FFT analyzer 18, moreover, an operator requires advanced expertise and experiences for reading a resonance frequency, an anti-resonance frequency and an attenuation. For this reason, there is a problem in that time and labor are taken.

When the servo regulation of the electric motor control apparatus is to be carried out, therefore, there has been required an apparatus capable of automatically reading an anti-resonance frequency, a resonance frequency and an attenuation from a frequency characteristic obtained by an actual measurement and modeling the characteristic of a machine which can be utilized for the simulation and the servo regulation of the control apparatus.

The invention has been made in order to solve the problems and has an object to provide a machine model estimating device of an electric motor control apparatus which can estimate a machine model to be easily utilized for a simulation and a servo regulation by automatically reading an anti-resonance frequency, a resonance frequency and an attenuation from a frequency characteristic measured value without using an expensive measuring apparatus even if an operator has neither advanced expertise nor experiences, and is inexpensive.

DISCLOSURE OF THE INVENTION

In order to solve the problems, a first aspect of the invention is directed to a machine model estimating device of an electric motor control apparatus comprising an electric motor for driving a load machine, a rotation detector for detecting a rotating angle of the electric motor, and a servo control device for controlling the electric motor, comprising a calculating device for outputting an operation command signal for operating the electric motor to the servo control device, and frequency characteristic equations for a rigid body model and an N-inertia model (N is an integer which is equal to or greater than 2) which are previously input to the calculating device, wherein the calculating device includes a frequency characteristic measuring section for measuring a frequency characteristic from the operation command signal and a signal of the rotation detector input from the servo control device to the calculating device, a frequency characteristic peak detecting section for automatically calculating protruded shapes to be a resonance frequency and an anti-resonance frequency from a shape of the frequency characteristic measured by the frequency characteristic measuring section, an attenuation estimation value analyzing section for estimating an attenuation from the resonance frequency and the anti-resonance frequency which are detected by the frequency characteristic peak detecting section, a frequency characteristic error calculating section for calculating errors of the frequency characteristics calculated in the frequency characteristic equation for the N-inertia model and the frequency characteristic equation for the rigid body model from the frequency characteristic obtained by the measurement respectively, and a machine model deciding section for comparing a minimum error of a calculated value of the frequency characteristic of the N-inertia model which is obtained in the frequency characteristic error calculating section and a measured value with a minimum error of a calculated value of the frequency characteristic of the rigid body model and a measured value and deciding, as an actual model, either of the models which has a smaller error.

Moreover, a second aspect of the invention is directed to the machine model estimating device of an electric motor control apparatus according to the first aspect of the invention, wherein the frequency characteristic error calculating section carries out curve fitting of the frequency characteristic obtained from the operation command signal and the signal of the rotation detector to the frequency characteristic equation, thereby calculating an error of the calculated value of the frequency characteristic and the measured value.

Furthermore, a third aspect of the invention is directed to a machine model estimating device of an electric motor control apparatus comprising an electric motor for driving a load machine, a vibration detector for detecting a vibration of the load machine, and a servo control device for controlling the electric motor, comprising a calculating device for outputting an operation command signal for operating the electric motor to the servo control device, and frequency characteristic equations of a rigid body model and an N-inertia model (N is an integer which is equal to or greater than 2) which are previously input to the calculating device, wherein the calculating device includes a frequency characteristic measuring section for measuring a frequency characteristic from the operation command signal and a signal of the vibration detector input from the servo control device to the calculating device, a frequency characteristic peak detecting section for automatically calculating protruded shapes to be a resonance frequency and an anti-resonance frequency from a shape of the frequency characteristic measured by the frequency characteristic measuring section, an attenuation estimation value analyzing section for estimating an attenuation from the resonance frequency and the anti-resonance frequency which are detected by the frequency characteristic peak detecting section, a frequency characteristic error calculating section for calculating errors of the frequency characteristics calculated in the frequency characteristic equation for the N-inertia model and the frequency characteristic equation for the rigid body model from the frequency characteristic obtained by the measurement respectively, and a machine model deciding section for comparing a minimum error of a calculated value of the frequency characteristic of the N-inertia model which is obtained in the frequency characteristic error calculating section and a measured value with a minimum error of a calculated value of the frequency characteristic of the rigid body model and a measured value and deciding, as an actual model, either of the models which has a smaller error.

In addition, a fourth aspect of the invention is directed to the machine model estimating device of an electric motor control apparatus according to the third aspect of the invention, wherein the frequency characteristic error calculating section carries out curve fitting of the frequency characteristic obtained from the operation command signal and the signal of the vibration detector to the frequency characteristic equation, thereby calculating an error of the calculated value of the frequency characteristic and the measured value.

BEST MODE FOR CARRYING OUT THE INVENTION

Embodiments of the invention will be described below with reference to the drawings.

[First Embodiment]

Figure 1:
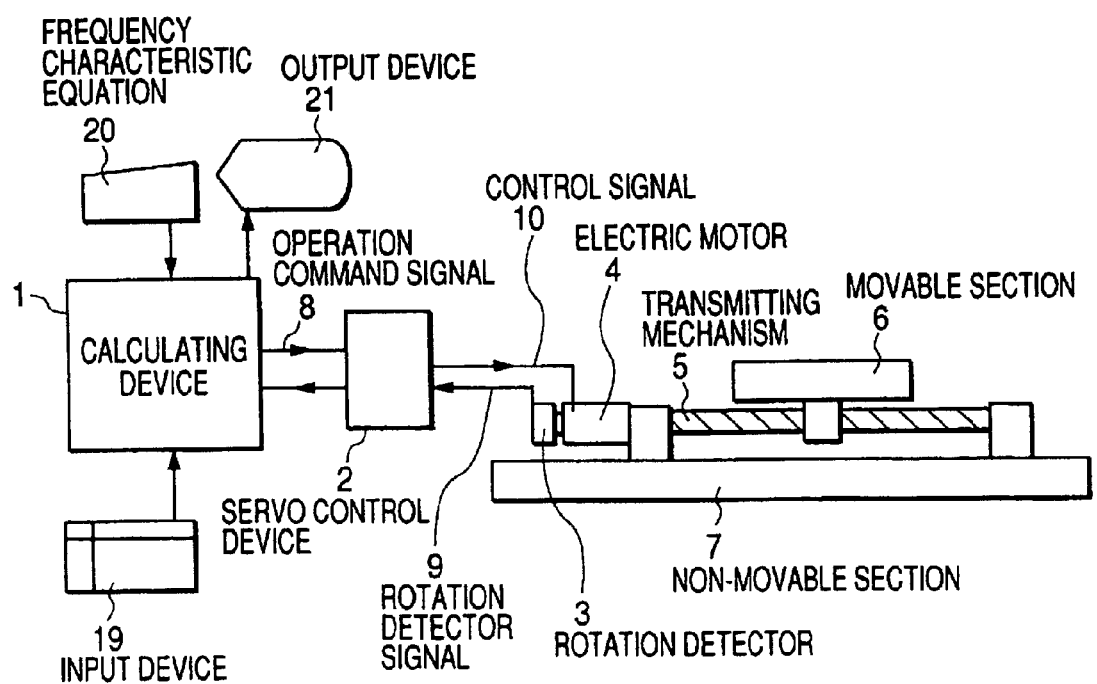
FIG. 1 is a view showing the whole structure of an electric motor control apparatus comprising a machine model estimating device according to a first embodiment of the invention.
Figure 2:
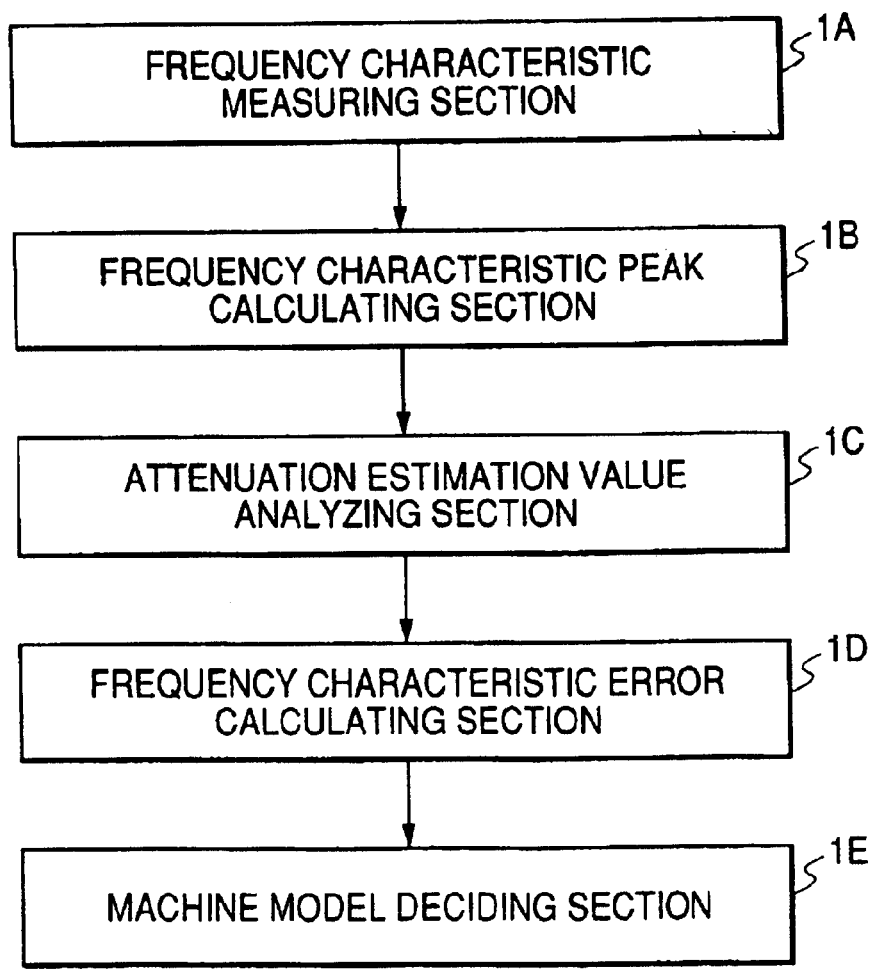
FIG. 2 is a block diagram showing the structure of a calculating device according to the first embodiment.

FIG. 1 is a view showing the whole structure of an electric motor control apparatus comprising a machine model estimating device according to a first embodiment of the invention, and FIG. 2 is a block diagram showing the structure of a calculating device. The same components of the invention as those in the conventional art have the same reference numerals and description thereof will be omitted, and furthermore, only differences will be described.

In the drawing, 1 denotes a calculating device, 1A denotes a frequency characteristic measuring section, 1B denotes a frequency characteristic peak detecting section, 1C denotes an attenuation estimation value analyzing section, 1D denotes a frequency characteristic error calculating section, 1E denotes a machine model deciding section, 19 denotes an input device, 20 denotes a frequency characteristic equation, and 21 denotes an output device.

The invention is different from the conventional art as follows.

More specifically, there are provided the calculating device 1 for outputting, to a servo control device 2, an operation command signal 8 to operate an electric motor 4, and the frequency characteristic equations 20 for a rigid body model and a 2-inertia model which are previously input to the calculating device 1.

Moreover, the calculating device 1 includes the frequency characteristic measuring section 1A for measuring the frequency characteristic of a load machine from the operation command signal 8 and a signal 9 of a rotation detector 3 which is input from the servo control device 2 to the calculating device 1, the frequency characteristic peak detecting section 1B for automatically calculating protruded shapes to be a resonance frequency and an anti-resonance frequency from a shape of the frequency characteristic measured by the frequency characteristic measuring section 1A, the attenuation estimation value analyzing section 1C for estimating an attenuation from the resonance frequency and the anti-resonance frequency which are detected by the frequency characteristic peak detecting section 1B, the frequency characteristic error calculating section 1D for calculating errors of the frequency characteristics calculated in the frequency characteristic equation 20 for the 2-inertia model and the frequency characteristic equation 20 for the rigid body model from the frequency characteristic obtained by the measurement respectively, and the machine model deciding section 1E for comparing a minimum error of a calculated value of the frequency characteristic of the 2-inertia model which is obtained in the frequency characteristic error calculating section 1D and a measured value with a minimum error of a calculated value of the frequency characteristic of the rigid body model and a measured value and deciding, as an actual model, either of the models which has a smaller error.

Furthermore, the frequency characteristic error calculating section 1D carries out curve fitting of the frequency characteristic obtained from the operation command signal 8 and the signal 9 of the rotation detector 3 to the frequency characteristic equation 20, thereby calculating an error of the calculated value of the frequency characteristic and the measured value.

Next, an operation will be described.

Figure 3:
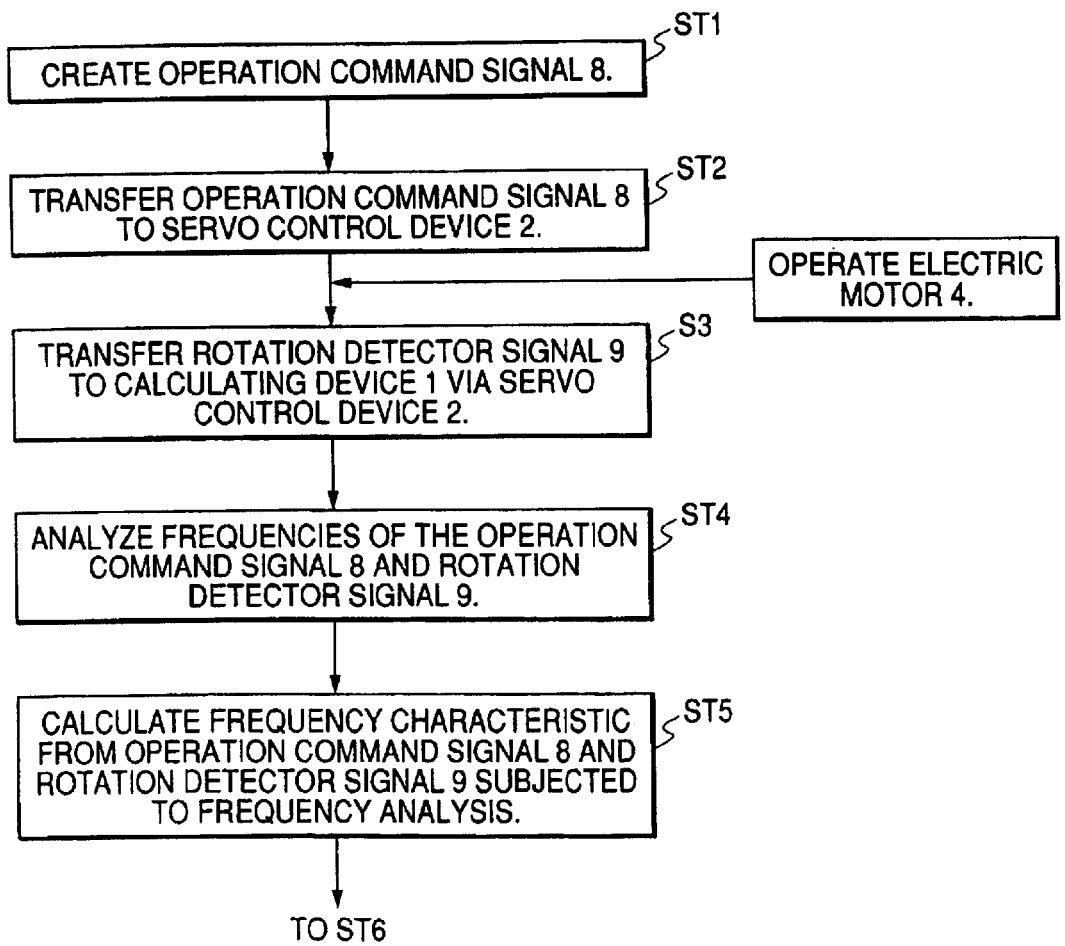
FIG. 3 is a flow chart related to the measurement of a frequency characteristic in a procedure for the calculating operation of the calculating device according to the first embodiment.
Figure 4:
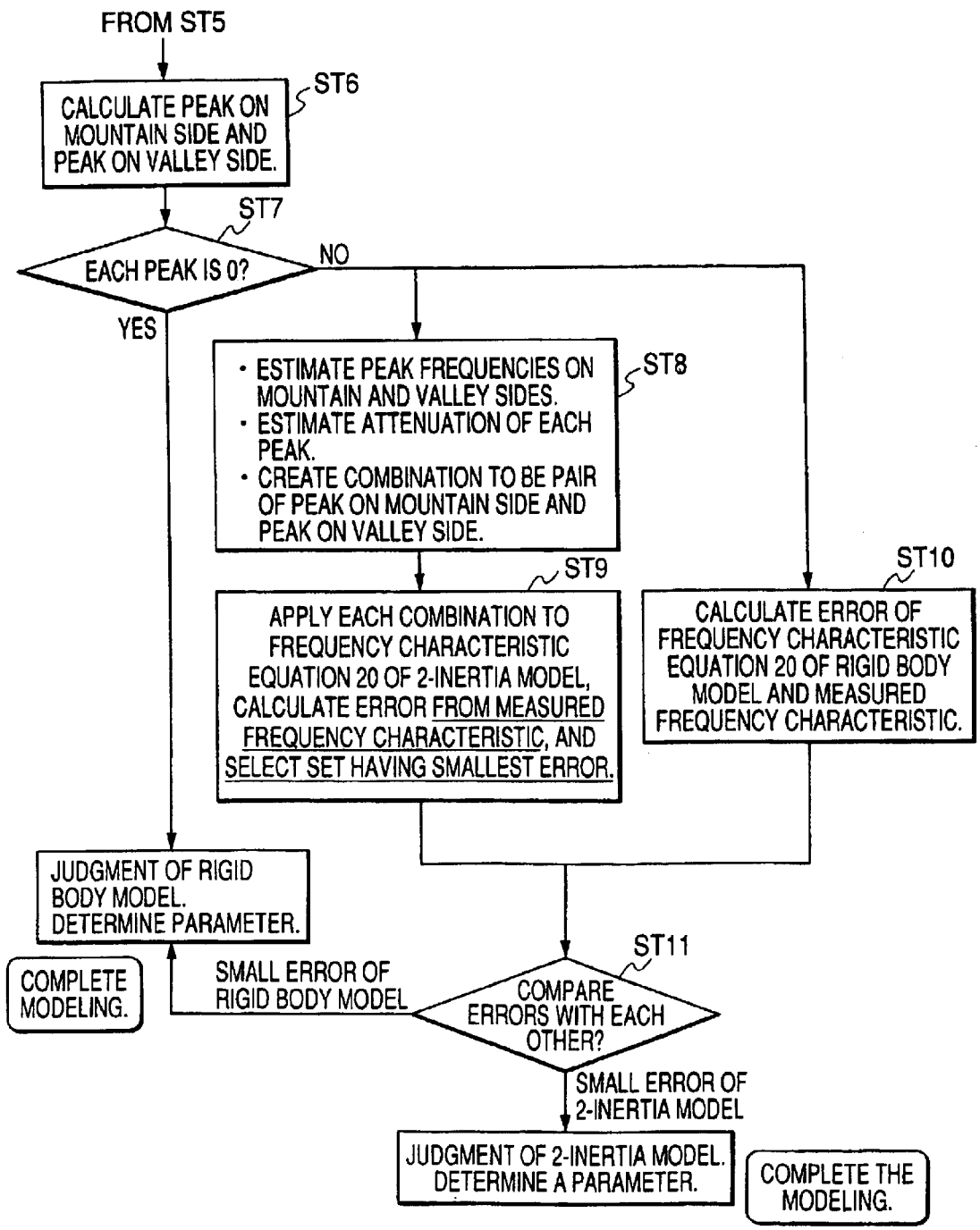
FIG. 4 is a flow chart related to an operation for deciding a machine model based on the frequency characteristic value thus measured in the procedure for the calculating operation of the calculating device according to the first embodiment.

FIG. 3 is a flow chart related to the measurement of a frequency characteristic in a procedure for the calculating operation of the calculating device according to the first embodiment, and FIG. 4 is a flow chart related to an operation for deciding a machine model based on the frequency characteristic value thus measured in the procedure for the calculating operation of the calculating device according to the first embodiment.

The procedure for the calculating operation of the calculating device 1 is divided into steps ST1 to ST5 for measuring a frequency characteristic (FIG. 3) and steps ST6 to ST11 for comparing a model based on the frequency characteristic equation 20 with a measured frequency characteristic to model the characteristic of a machine (FIG. 4).

The processings of the steps ST4 and ST5 correspond to the frequency characteristic measuring section 1A of the calculating device 1 shown in FIG. 2, and the processings of the steps ST6 and ST7 correspond to the frequency characteristic peak detecting section 1B. Moreover, the processing of the step ST8 corresponds to the attenuation estimation value analyzing section 1C, the processings of the steps ST9 and ST10 correspond to the frequency characteristic error calculating section 1D, and the processing of the step ST11 corresponds to the machine model deciding section 1E.

First of all, the measurement of the frequency characteristic in the steps ST1 to ST5 will be described with reference to FIG. 3.

At the step ST1, first of all, the calculating device 1 creates the operation command signal 8.

At the step ST2, next, the operation command signal 8 output from the calculating device 1 is transferred to the servo control device 2. Consequently, an equivalent control signal 10 to the operation command signal 8 is sent to the electric motor 4 and the electric motor 4 is operated so that a movable section 6 is operated through a transmitting mechanism 5 and generates a vibration.

At the step ST3, then, the rotation detector 3 detects the rotation detector signal 9 in the rotating operation of the electric motor 4 and transfers the rotation detector signal 9 to the calculating device 1 via the servo control device 2.

At the step ST4, thereafter, ah FFT calculation is carried out over the operation command signal 8 and the rotation detector signal 9 by the calculating device 1, thereby performing a frequency analysis, for example.

At the step ST5, a frequency characteristic is calculated from the operation command signal 8 and the rotation detector signal 9 which are subjected to the frequency analysis in the calculating device 1. By these processings, the frequency characteristic is completely measured.

Next, description will be given to the modeling of the machine characteristic at the steps ST6 to ST11.

Figure 5:
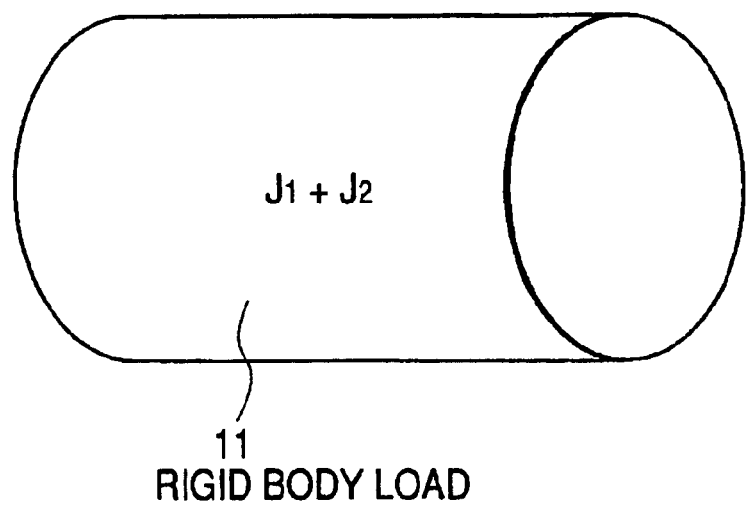
FIG. 5 is a view schematically showing a rigid body model.
Figure 6:
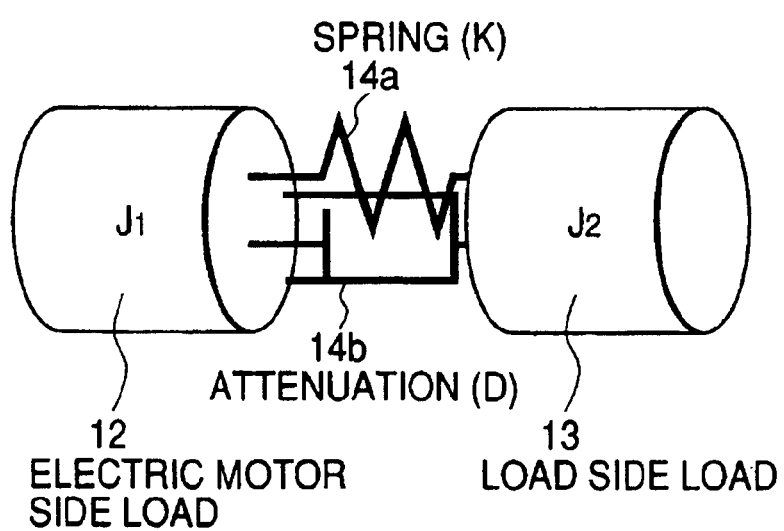
FIG. 6 is a view schematically showing a 2-inertia model.

Referring to the modeling of the machine characteristic, first of all, a division into the rigid body model and the 2-inertia model can be carried out as shown in FIGS. 5 and 6, respectively.

FIG. 5 is a view schematically showing the rigid body model. More specifically, the electric motor 4, the transmitting mechanism 5 and the movable section 6 shown in FIG. 1 are caused to approximate to a simple rigid body load 11 (J1+J2). Moreover, FIG. 6 is a view schematically showing the 2-inertia model. More specifically, the electric motor 4, the transmitting mechanism 5 and the movable section 6 shown in FIG. 1 are caused to approximate to the 2-inertia model by two boxes having an electric motor side load 12 (J1) and a load side load 13 (J2), and a spring 14a (K: spring constant) and an attenuation 14b (D: attenuation constant) connecting the two boxes 12 and 13. The rigid body load 11 is equivalent to (J1+J2) to be the sum of the electric motor side load 12 and the load side load 13.

In the rigid body model shown in FIG. 5, a model equation for a frequency characteristic Hr from the operation command signal 8 to the rotation detector signal 9 is obtained as shown in Equation (1).

$$H_r = \frac{1}{(J_1 + J_2) \cdot s} \qquad \text{Equation (1)}$$

In the 2-inertia model shown in FIG. 6, moreover, a model equation for a frequency characteristic $H_f$ from the operation command signal 8 to the rotation detector signal 9 is obtained as shown in Equation (2).

$$H_f = \frac{1}{J_1 \cdot s} \cdot \frac{S2 + \frac{D}{J2} \cdot s + \frac{K}{J2}}{s^2 + \left(\frac{1}{J_1} + \frac{1}{J_2}\right) \cdot D \cdot s + \left(\frac{1}{J_1} + \frac{1}{J_2}\right) \cdot K} \qquad \text{Equation (2)}$$

In order to approximate to the rigid body model, it is sufficient that the sum (J1+J2) of the rigid body load 11 or the electric motor side load 12 and the load side load 13 is clear.

In order to approximate to the 2-inertia model, moreover, it is sufficient that the electric motor side load 12 (J1) and the load side load 13 (J2), and the spring constant K and the attenuation constant D are clear.

Figure 7:
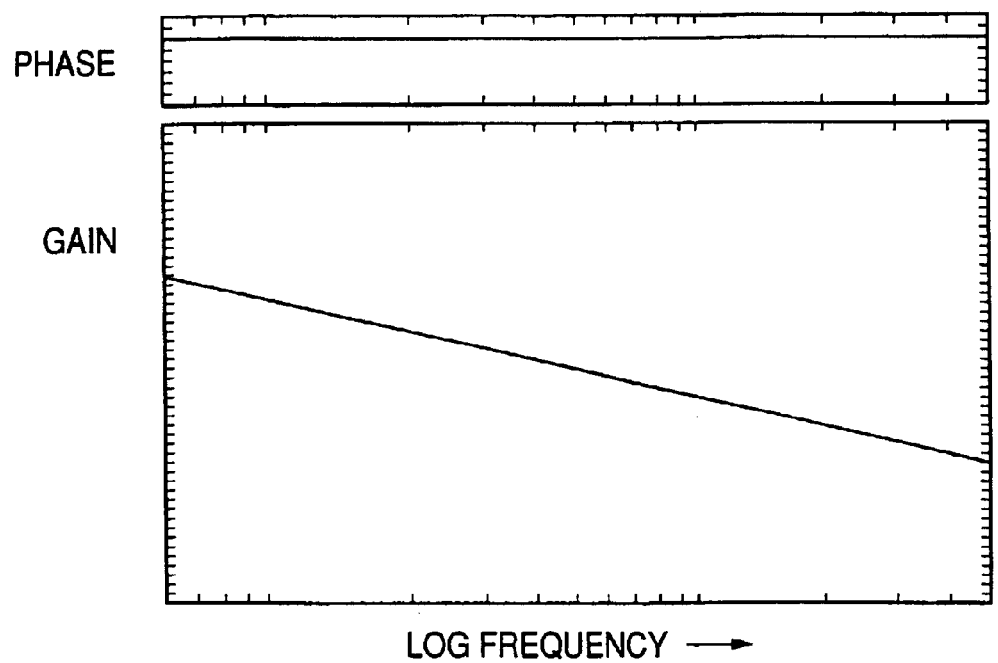
FIG. 7 is a chart showing an example of the frequency characteristic of the rigid body model according to the first embodiment.
Figure 8:
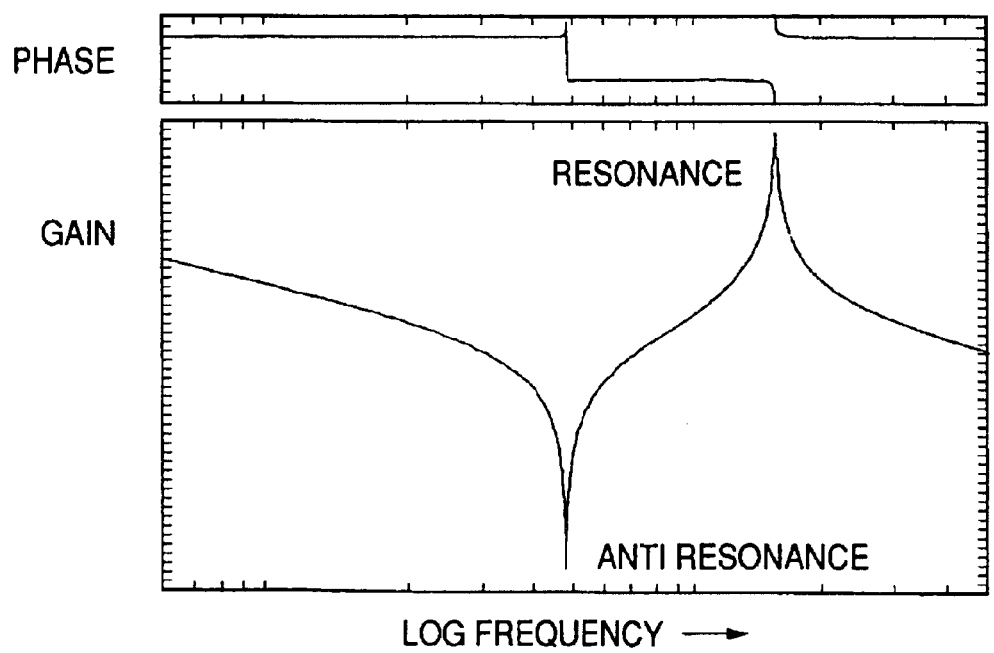
FIG. 8 is a chart showing an example of the frequency characteristic of the 2-inertia model according to the first embodiment.

FIG. 7 is a chart showing an example of the frequency characteristic of the rigid body model according to the first embodiment and FIG. 8 is a chart showing an example of the frequency characteristic of the 2-inertia model according to the first embodiment, and both of them are charts showing a calculation using model equations.

The Equation (1) for the rigid body model represents a gain characteristic which is smooth, rightward and downward as shown in FIG. 7, while the Equation (2) for the 2-inertia model represents a gain characteristic having a protruded shape, that is, a mountain and a valley as shown in FIG. 8. The valley and mountain sides shown in FIG. 8 are referred to as an anti-resonance and a resonance respectively, and an anti-resonance frequency $F_L$ and a resonance frequency $F_H$ can approximate to Equations (3) and (4) from the Equation (2) respectively.

$$f_L = \frac{1}{2\pi} \cdot \sqrt{\frac{K}{J_2}} \qquad \text{Equation (3)}$$

$$f_H = \frac{1}{2\pi} \cdot \sqrt{K \cdot \left(\frac{1}{J_1} + \frac{1}{J_2}\right)} \qquad \text{Equation (4)}$$

In this case, the rightward and downward inclination of a low frequency region in FIG. 8 can approximate to the Equation (1).

For this reason, the sum (J1+J2) of the anti-resonance frequency FL, the resonance frequency $F_H$, the electric motor side load 12 and the load side load 13 is clear and an approximation to the 2-inertia model can be carried out.

Moreover, the sum (J1+J2) of the electric motor side load 12 and the load side load 13 can be calculated by the dimension and physical characteristic of the load machine. If (J1+J2) is previously calculated, furthermore, it can be input in the input device 19 connected to the calculating device 1 (described in INERTIA IDENTIFYING METHOD AND AUTOTUNING: VOL. 62, NO. 4, Technical Report "YASKAWA ELECTRIC CORPORATION", for example).

From the foregoing, it is possible to compare the measured frequency characteristic with the Equations (1) and (2), thereby deciding whether either the rigid body model or the 2-inertia model is suitable.

Figure 9:
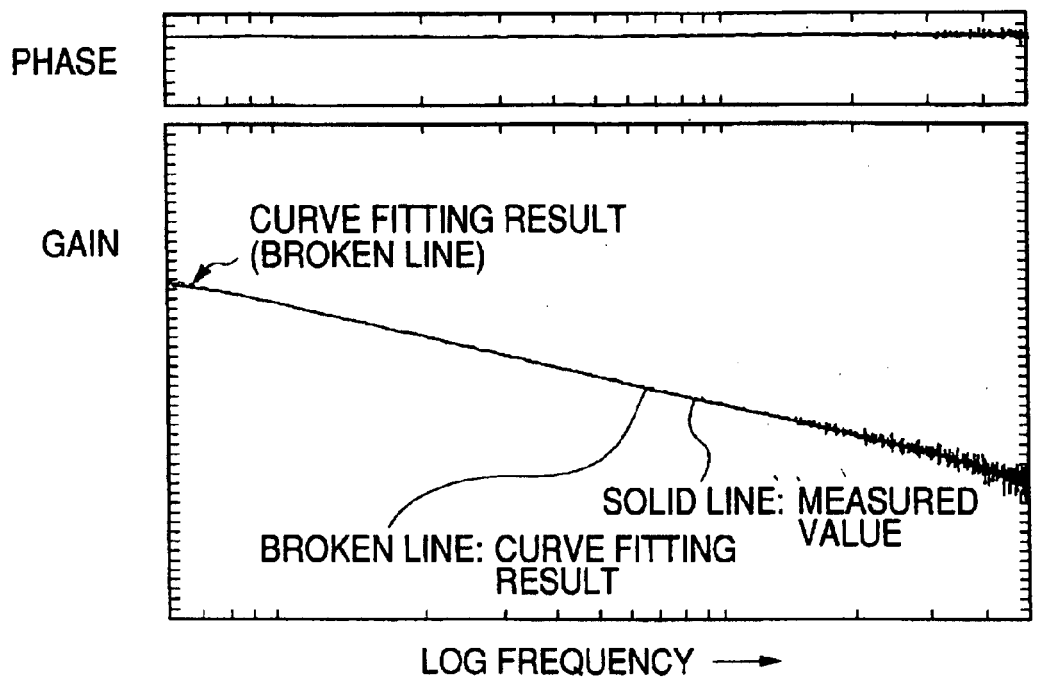
FIG. 9 is a chart showing an example of a curve fitting result of a rigid body model type according to the first embodiment.
Figure 10:
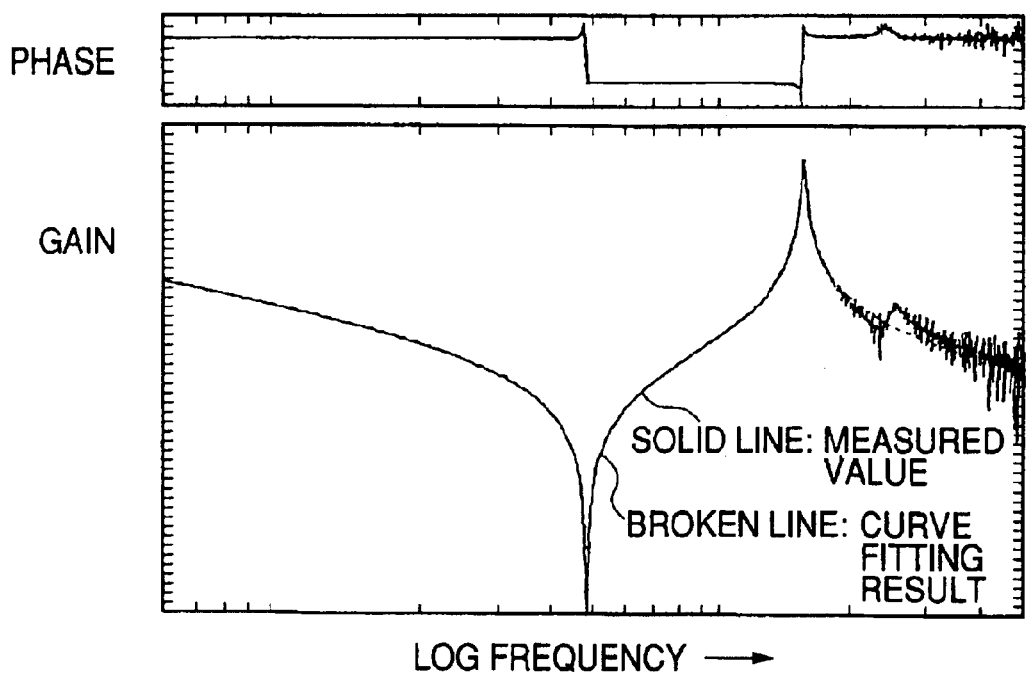
FIG. 10 is a chart showing an example of a curve fitting result of a 2-inertia model type according to the first embodiment.

FIG. 9 is a chart showing an example of the curve fitting result of the rigid body model type according to the first embodiment and FIG. 10 is a chart showing an example of the curve fitting result of the 2-inertia model type according to the first embodiment. In the drawing, a solid line indicates a measured value and a broken line indicates a curve fitting result.

Since a frequency characteristic changed smoothly from a left and upper portion toward a right and lower portion represents a measurement result in FIG. 9, curve fitting can be carried out with a small error from the graph of the Equation (1). On the other hand, since a frequency characteristic having a plurality of valleys and mountains represents a measurement result in FIG. 10, the curve fitting can be carried out with a small error from the graph of the Equation (2).

A processing of modeling a machine characteristic will be executed below by using the steps ST6 to ST11 in the flow chart of FIG. 3.

At the step ST6, first of all, a peak on a mountain side and a peak on a valley side are calculated from the frequency characteristic measured at the step ST5. For a method of calculating the peak, it is preferable to use a complex spectrum interpolating method and a smoothing differentiation method which are well-known.

If the peak on the mountain side and the peak on the valley side cannot be detected at the step ST7, next, the model can be decided to be a rigid body and the parameter of the rigid body can be determined by only a load inertia to be the sum (J1+J2) of the electric motor side load 12 and the load side load 13. If the peak can be detected at the step ST7, the processing proceeds to the step ST8 in which an attenuation can be estimated based on a well-known attenuation estimating method by using the frequency of the peak thus detected.

If the sum (J1+J2) of the electric motor side load 12 and the load side load 13 is undecided, moreover, the load inertia (J1+J2) may be calculated, by a least square method using the Equation (1), from the low frequency region of the measured frequency characteristic which is lower than the peak on the valley side.

If a plurality of peaks can be detected, furthermore, a plurality of combinations to be a pair of the peak on the mountain side and the peak on the valley side is set and created.

At the step ST9, then, the combination to be a peak pair which is set temporarily is subjected to curve fitting by the frequency characteristic equation 20 for the 2-inertia model input previously to the calculating device 1, that is, the Equation (2), thereby calculating an error of the Equation (2) and the measured value.

Errors of results obtained by the curve fitting and the measured frequency characteristics are calculated by using the combinations of the peaks, respectively.

Since the load inertia (J1+J2), a pair of the peak on the mountain side and the peak on the valley side, that is, a resonance and an anti-resonance frequency, and an attenuation are clear, it is possible to carry out the curve fitting by substituting each value for the Equation (2) to be one of the frequency characteristic equations 20 input to the calculating device 1.

Any of the combinations which has a small error from the result obtained by the curve fitting makes a set of the peak on the mountain side and the peak on the valley side which is optimum for the 2-inertia model.

Figure 11:
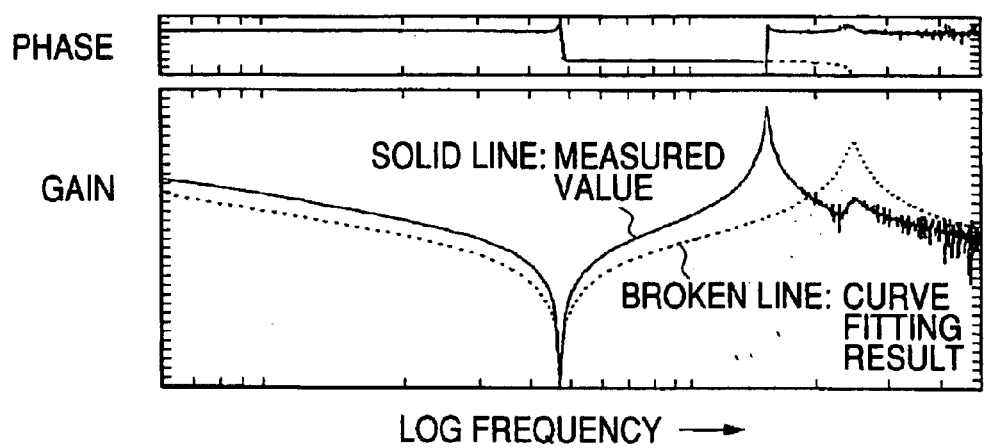
FIG. 11 is a chart showing an example of the curve fitting result of the 2-inertia model type having a great error according to the first embodiment.

FIG. 11 is a chart showing an example of the curve fitting result of the 2-inertia model type having a great error according to the first embodiment. In the drawing, a solid line indicates a measured value and a broken line indicates a curve fitting result.

For example, a set of the resonance and the anti-resonance shown in FIG. 10 has a small error, while a set of the resonance and the anti-resonance shown in FIG. 11 has a great error. Therefore, it is clear that the set of FIG. 10 is optimum for the resonance and the anti-resonance in the 2-inertia model.

At the step ST10, also in the case in which the peak is detected, an error of the result obtained by the curve fitting to the rigid body model and the measured frequency characteristic is calculated by the Equation (1) to be one of the frequency characteristic equations 20 input to the calculating device 1.

At the step ST11, next, the minimum error of the 2-inertia model is compared with the error of the rigid body model. If the error of the rigid body model is small, a decision of the rigid body model can be made. If the error of the 2-inertia model is small, a decision of the 2-inertia model can be made. In other words, it is possible to compare the error of the Equation (2) and the measured frequency characteristic with the error of the Equation (1) and the measured frequency characteristic, thereby deciding which error is smaller and which model is optimum in the modeling for the Equation (1) and the Equation (2).

Figure 12:
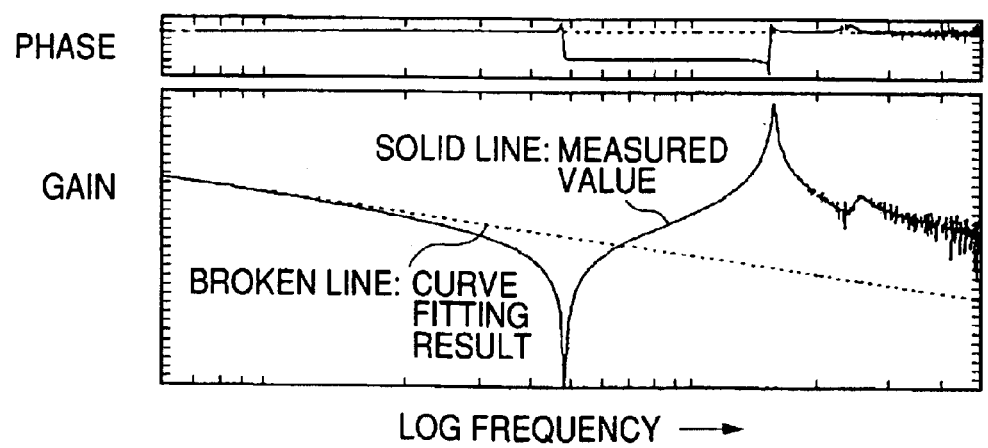
FIG. 12 is a chart showing an example of an unfitness to the curve fitness of the rigid body model type according to the first embodiment.
Figure 13:
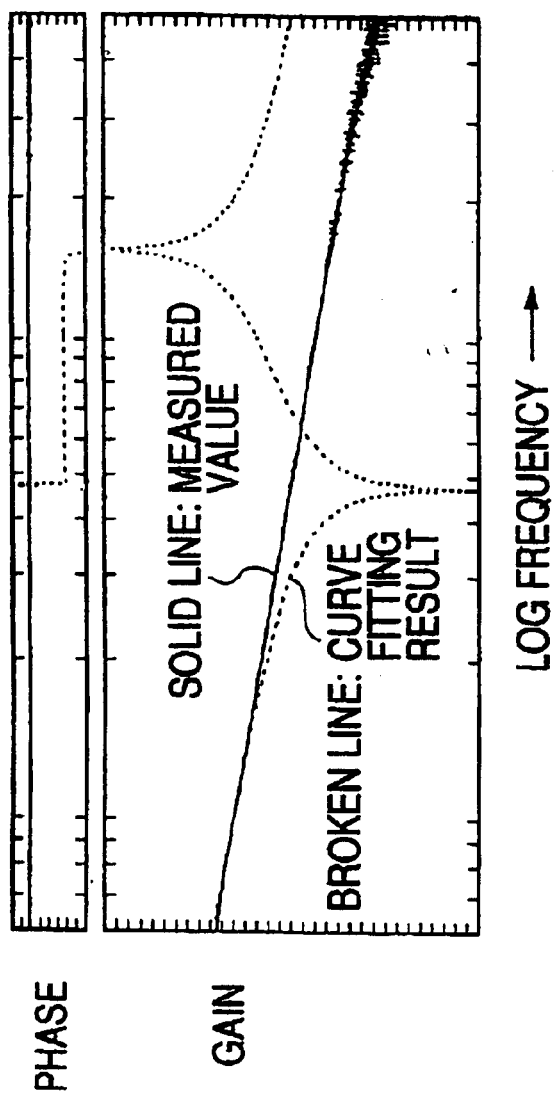
FIG. 13 is a chart showing an example of an unfitness to the curve fitness of the 2-inertia model type according to the first embodiment.

FIG. 12 is a chart showing an example of an unfitness to the curve fitting of the rigid body model type according to the first embodiment and FIG. 13 is a chart showing an example of an unfitness to the curve fitting of the 2-inertia model type according to the first embodiment. In the drawing, a solid line indicates a measured value and a broken line indicates a curve fitting result.

While the measured value of the frequency characteristic in FIG. 12 has a plurality of valleys and mountains, for example, the curve fitting is carried out in the Equation (1) for the rigid body model so that an error is great. As shown in FIG. 10, however, the error is small in the Equation (2) for the 2-inertia model. Therefore, a decision of the 2-inertia model can be made.

While the frequency characteristic changed smoothly from a left and upper portion toward a right and lower portion represents a measurement result, moreover, the curve fitting is carried out in the Equation (2) for the 2-inertia model so that the error is great. As shown in FIG. 9, however, the error is small in the Equation (1) for the rigid body model. Therefore, a decision of the rigid body model can be made.

When the decision of the model is completed, the result can be output to the output device 21 connected to the calculating device 1 and can be utilized for a simulation and the regulation of the electric motor control apparatus.

Accordingly, the first embodiment is characterized by the electric motor control apparatus comprising the electric motor 4 for driving a load machine, the rotation detector 3 for detecting the rotating angle of the electric motor 4, and the servo control device 2 for controlling the electric motor 4, comprising the calculating device 1 for outputting the operation command signal 8 for operating the electric motor 4 to the servo control device 2, and the frequency characteristic equations 20 of the rigid body model and the 2-inertia model which are previously input to the calculating device 1. Moreover, the calculating device-1 includes the frequency characteristic measuring section 1A for measuring the frequency characteristic of the load machine from the operation command signal 8 and the signal 9 of the rotation detector 3 input from the servo control device 2 to the calculating device 1, the frequency characteristic peak detecting section 1B for automatically calculating protruded shapes to be a resonance frequency and an anti-resonance frequency from a shape of the frequency characteristic measured by the frequency characteristic measuring section 1A, the attenuation estimation value analyzing section 1C for estimating an attenuation from the resonance frequency and the anti-resonance frequency which are detected by the frequency characteristic peak detecting section 1B, the frequency characteristic error calculating section 1D for calculating errors of the frequency characteristics calculated in the frequency characteristic equation 20 for the 2-inertia model and the frequency characteristic equation 20 for the rigid body model from the frequency characteristic obtained by the measurement respectively, and the machine model deciding section 1E for comparing a minimum error of a calculated value of the frequency characteristic of the 2-inertia model which is obtained in the frequency characteristic error calculating section 1D and a measured value with a minimum error of a calculated value of the frequency characteristic of the rigid body model and a measured value and deciding, as an actual model, either of the models which has a smaller error. Furthermore, the frequency characteristic error calculating section 1D carries out curve fitting of the frequency characteristic obtained from the operation command signal 8 and the signal 9 of the rotation detector 3 to the frequency characteristic equation 20, thereby calculating an error of the calculated value of the frequency characteristic and the measured value. Consequently, it is possible to provide a machine model estimating device of an electric motor control apparatus which can faithfully estimate a machine model to be easily utilized for a simulation and a servo regulation by automatically reading an anti-resonance frequency, a resonance frequency and an attenuation from a frequency characteristic measured value without using an expensive measuring apparatus even if an operator has neither advanced expertise nor experiences, and furthermore, is inexpensive.

[Second Embodiment]

A second embodiment of the invention will be described with reference to the drawings.

Figure 14:
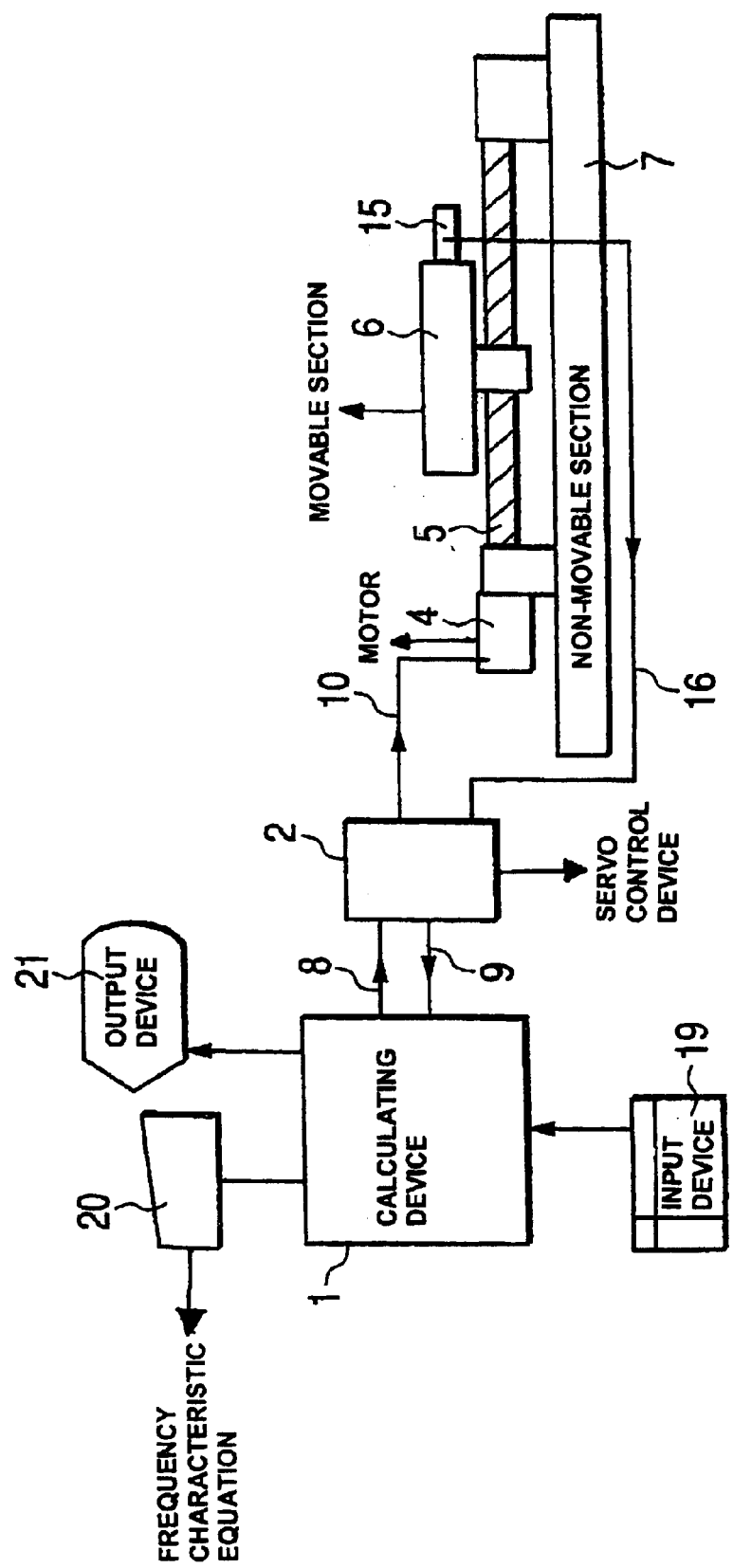
FIG. 14 is a view showing the whole structure of an electric motor control apparatus comprising a machine model estimating device according to a second embodiment of the invention.
Figure 15:
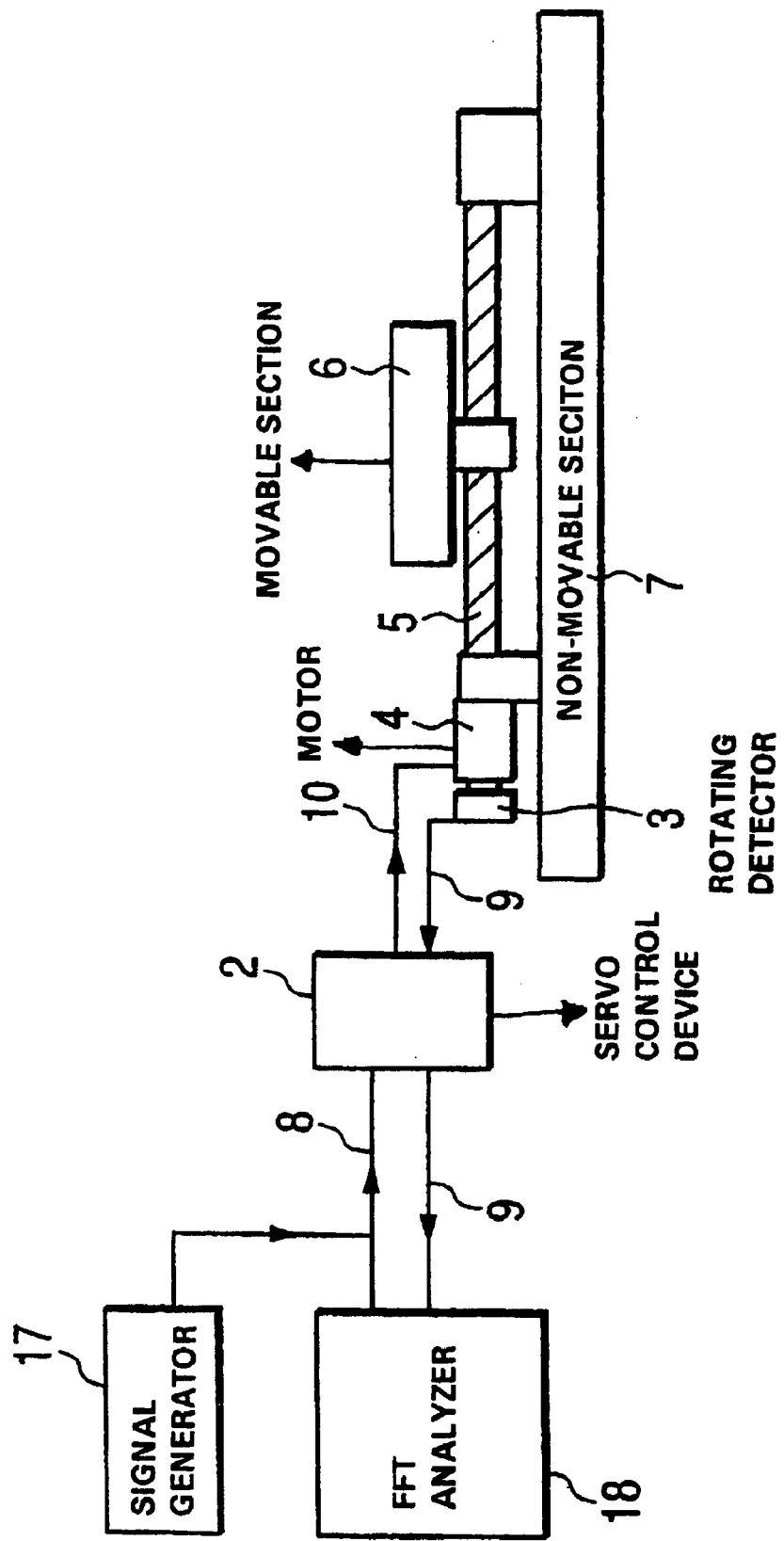
FIG. 15 is a view showing the whole structure of an electric motor control apparatus according to the conventional art.

FIG. 14 is a view showing the whole structure of an electric motor control apparatus comprising a machine model estimating device according to the second embodiment of the invention.

In the drawing, 15 denotes a vibration detector for detecting the operation state of a load machine as a vibration displacement or a vibration acceleration, and 16 denotes a vibration detector signal of the load machine.

The second embodiment uses the vibration detector 15 in the load machine in place of the rotation detector described in the first embodiment, and can be executed in the same manner as the first embodiment.

A frequency characteristic Hr from an operation command signal 8 of a rigid body model to the detector 15 is equal to that of the Equation (1). Moreover, a frequency characteristic $H'_F$ from the operation command signal 8 of a 2-inertia model to the vibration detector 15 of a load side load 13 is obtained from Equation (5).

$$H_f^7 = \frac{1}{J_1 \cdot J_2 \cdot s} \cdot \frac{D \cdot s + K}{s^2 + \left(\frac{1}{J_1} + \frac{1}{J_2}\right) \cdot D \cdot s + K \cdot \left(\frac{1}{J_1} + \frac{1}{J_2}\right) \cdot K} \quad \text{Equation (5)}$$

Thus, the second embodiment is executed by using the vibration detector 15 in the load machine in place of the rotation detector according to the first embodiment. In the same manner as in the first embodiment, consequently, a peak on the mountain side of the measured frequency characteristic is estimated, an attenuation is estimated, a load inertia is estimated, a resonance is temporarily determined, and the resonance is compared with the frequency characteristic of the model with a change and a resonance having a small error is obtained, and furthermore, the frequency characteristics of the rigid body model and the 2-inertia model are compared with each other, the model having a smaller error is distinguished, and the measured frequency characteristic is subjected to curve fitting. Thus, modeling can be faithfully executed.

While the two machine models, that is, the rigid body model and the 2-inertia model are used in the embodiment, another model such as a 3-inertia model may be used or the type of the model to be distinguished may be increased.

While only the model and the error of the measured frequency characteristic are set to be evaluation criteria in the embodiment, moreover, the value of the gain of a resonance frequency, the widths of the gains of an anti-resonance frequency and the resonance frequency, and a frequency may be added to the evaluation criteria.

INDUSTRIAL APPLICABILITY

As described above, the machine model estimating device of the electric motor control apparatus according to the invention is useful for the servo regulation of an electric motor control apparatus to be used in a semiconductor manufacturing apparatus, a positioning apparatus such as a machine tool or an industrial robot, for example.

What is claimed is:

1. A machine model estimating device of an electric motor control apparatus comprising an electric motor for driving a load machine, a rotation detector for detecting a rotating angle of the electric motor, and a servo control device for controlling the electric motor, comprising a calculating device for outputting an operation command signal for operating the electric motor to the servo control device, and frequency characteristic equations for a rigid body model and an N-inertia model, N being an integer which is equal to or greater than 2 which are previously input to the calculating device, wherein the calculating device includes a frequency characteristic measuring section for measuring a frequency characteristic from the operation command signal and a signal of the rotation detector input from the servo control device to the calculating device, a frequency characteristic peak detecting section for automatically calculating protruded shapes to be a resonance frequency and an anti-resonance frequency from a shape of the frequency characteristic measured by the frequency characteristic measuring section, an attenuation estimation value analyzing section for estimating an attenuation from the resonance frequency and the anti-resonance frequency which are detected by the frequency characteristic peak detecting section, a frequency characteristic error calculating section for calculating errors of the frequency characteristics calculated in the frequency characteristic equation for the N-inertia model and the frequency characteristic equation for the rigid body model from the frequency characteristic obtained by the measurement respectively, and a machine model deciding section for comparing a minimum error of a calculated value of the frequency characteristic of the N-inertia model which is obtained in the frequency characteristic error calculating section and a measured value with a minimum error of a calculated value of the frequency characteristic of the rigid body model and a measured value and deciding, as an actual model, either of the models which has a smaller error.

2. The machine model estimating device of an electric motor control apparatus according to claim 1, wherein the frequency characteristic error calculating section carries out curve fitting of the frequency characteristic obtained from the operation command signal and the signal of the rotation detector to the frequency characteristic equation, thereby calculating an error of the calculated value of the frequency characteristic and the measured value.

3. A machine model estimating device of an electric motor control apparatus comprising an electric motor for driving a load machine, a vibration detector for detecting a vibration of the load machine, and a servo control device for controlling the electric motor, comprising a calculating device for outputting an operation command signal for operating the electric motor to the servo control device, and frequency characteristic equations of a rigid body model and an N-inertia model N being an integer which is equal to or greater than 2 which are previously input to the calculating device, wherein the calculating device includes a frequency characteristic measuring section for measuring a frequency characteristic from the operation command signal and a signal of the vibration detector input from the servo control device to the calculating device, a frequency characteristic peak detecting section for automatically calculating protruded shapes to be a resonance frequency and an anti-resonance frequency from a shape of the frequency characteristic measured by the frequency characteristic measuring section, an attenuation estimation value analyzing section for estimating an attenuation from the resonance frequency and the anti-resonance frequency which are detected by the frequency characteristic peak detecting section, a frequency characteristic error calculating section for calculating errors of the frequency characteristics calculated in the frequency characteristic equation for the N-inertia model and the frequency characteristic equation for the rigid body model from the frequency characteristic obtained by the measurement respectively, and a machine model deciding section for comparing a minimum error of a calculated value of the frequency characteristic of the N-inertia model which is obtained in the frequency characteristic error calculating section and a measured value with a minimum error of a calculated value of the frequency characteristic of the rigid body model and a measured value and deciding, as an actual model, either of the models which has a smaller error.

4. The machine model estimating device of an electric motor control apparatus according to claim 3, wherein the frequency characteristic error calculating section carries out curve fitting of the frequency characteristic obtained from the operation command signal and the signal of the vibration detector to the frequency characteristic equation, thereby calculating an error of the calculated value of the frequency characteristic and the measured value.

* * * * *